Dec. 2, 1958  E. N. GOMBERG  2,862,796
METHOD AND MEANS FOR TESTING AQUEOUS SOLUTIONS
FOR PRESENCE OF PROTEIN
Filed July 20, 1953

INVENTOR.
EDWARD N. GOMBERG
BY Fulwider Mattingly & Babcock
Attorneys

United States Patent Office 2,862,796
Patented Dec. 2, 1958

2,862,796
METHOD AND MEANS FOR TESTING AQUEOUS SOLUTIONS FOR PRESENCE OF PROTEIN

Edward N. Gomberg, Torrance, Calif.

Application July 20, 1953, Serial No. 368,957

6 Claims. (Cl. 23—230)

My invention relates generally to the testing of aqueous solutions to detect the presence of protein therein, and more particularly, to the qualitative and quantitative analysis of urine for the presence of protein.

One of the most important phases of urinalysis is the detection of protein substances, such as albumin. Many kidney disorders and other diseases and organic malfunctions are detectable in their early stages by observing qualitatively and quantitatively the presence of protein substances such as albumin in the urine. Such tests are particularly advantageous as a part of general physical examinations for the reason that they may be taken simply, quickly, painlessly, and involve no danger of injury or discomfort to the examinee. Thus urinalysis, where applicable, is preferable to testing of blood samples, prolonged X-rays, cystoscopic examinations, and the like.

While, as above noted, the taking of a urine sample is a simple and painless procedure, the biochemical tests for albumin which have been heretofore employed, are relatively complex and subject to certain difficulties and uncertainties hereinafter noted.

Generally, albumin is present in urine as a so-called "molecular solution," i. e., a colloidal suspension in which the particles are too small to observe with a conventional microscope, and will pass freely through ordinary filters. A molecular solution which will pass through conventional filters and is invisible to the ordinary optical microscope consists in particles which are smaller than $1 \times 10^{-6}$ mm. If, on the other hand, the particles approach or exceed the size of $1 \times 10^{-4}$ mm., they can be retained by paper or porcelain filters, and are visible with ordinary high-power microscopes.

Many protein molecules, particularly albumin, have the property of joining together in molecular linkages so as to increase the size of the individual particles, such process being known as agglutination or coagulation. Coagulation of protein substances may be caused by the presence of certain acids, by heating, and even in some cases, by shaking or subjecting aqueous solutions of protein to high pressure. The commoner methods of denaturing protein, i. e., causing coagulation or agglutination, are heating, and treatment with certain acids, sometimes called alkaloid reagents.

Urine-albumin tests in the past have consisted in causing agglutination or coagulation to form a visible precipitate or suspension in an aqueous solution containing the urine sample under tests. Examples of such tests are: the Heller nitric acid ring test; the Roberts nitric acid and magnesium ring test; the Exton sulphosalicylic acid test; and the Osgood-Hoskins heat and acetic acid test.

The foregoing tests each involve at least some of the following disadvantages and difficulties.

(1) A number of precipitating, coagulating and other reagent chemicals must, in almost every case, be used and in many cases, some of the reagents used must be freshly prepared.

(2) Relatively complex chemical and heating apparatus must be used in many of the tests, and careful temperature control is important to achieve accurate results.

(3) Tests are largely qualitative, and require comparitor samples and the like to give even a rough quantitative estimate of the albumin content of a given sample.

(4) The visible precipitation or coagulum, when in a liquid solution, is evanescent and the results of any particular test cannot be preserved for later verification or checking.

(5) The foregoing test methods and procedures require a relatively highly skilled laboratory technician, particularly if accurate results are to be obtained.

With the foregoing problems in mind, it is a major object of the present invention to provide a vastly simplified method and means for testing urine for the presence of albumin and other proteins.

It is another object to provide a test of the class described which requires no elaborate chemical apparatus or reagents.

Still another object is to provide a test of the class described in which uniform results may be obtained by relatively unskilled or semi-skilled personnel.

A further object of the invention is to provide a test of the class described in which a permanent record is produced which may be verified, rechecked and compared with results of other tests.

Still further, it is an object of the present invention to provide a test patch for performing protein tests of the type described which test patch, after use, may readily be filed, mailed or otherwise handled without deterioration of the recorded test results.

Yet another object of the invention is to provide test method and means by which improved quantitative results may be obtained.

The foregoing and additional objects and advantages of the invention will be apparent from the following description of a presently preferred embodiment thereof.

Briefly, the test incorporating my invention consists in depositing a drop of the liquid to be tested on a porous test patch which has been specially pre-treated as will hereinafter be described. When the test sample has dried, a certain color pattern is produced on the patch, as will hereinafter be described in detail.

The pre-treatment above referred to includes a uniform suffusion of dye over the surface of the patch. The uniform color of the patch is altered by the addition of the sample to produce a contrastingly colored spot or pattern (where albumin is present), apparently due to a protein affinity of the dye molecules present in the patch, coupled with an immobilizing of the coagulated or agglutinated protein in the fibers or interstices of the patch.

For a more detailed description of the invention, reference should be had to the attached drawings in which.

Figure 1:
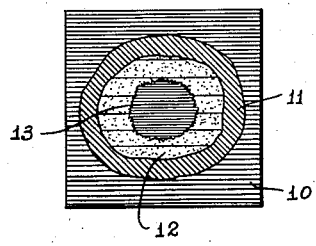
Figure 1 is a diagrammatic representation of a test patch treated in accordance with the present invention and illustrating the color pattern produced by depositing thereon a drop of liquid having a strong albumin content.

The test patch incorporating the present invention is indicated in the drawings by the reference character 10, and consists of a base sheet of chemically inert, porous material capable of being easily wetted by aqueous solutions. While various materials may be used for the base sheet, the patch I have found to be most suited to the above requirements, as well as being inexpensive and readily available, is a small piece of chemical filter paper.

The patch 10 is pretreated by dipping the same in a liquid coagulant or alkaloid reagent, such for example, as a 3% solution of phosphoric acid. Since albumin coagulants are known in the art, it is deemed unnecessary to provide a complete list herein. Suffice it to say that tannic, picric, phosphotungstic, phosphomolybdic, phosphoric, sulphosalicylic, trichloracetic, and ferrocyannic acids are some of the more important of such reagents.

At the same time that the patch 10 is treated with coagulant, it may, if desired, also be uniformly imbued with a water soluble, protein affinitive acid dye. Alternatively, a herein-termed "sequential" test method may be employed wherein the dye treatment may be deferred until after deposition of the test sample, as will hereinafter be described in more detail. The form of the invention involving pre-treatment with both dye and coagulant will be described first.

Among the dyes suitable to the above-described treatment are certain of the coal tar dyes certified, classified, listed and named in the United States by the Food and Drug Administration of the Federal Security Agency. Of the dyes certified and listed as above stated, all but four of those which are water soluble are known as acid dyes for the reason that they behave generally as acids in their classical chemical reactions. A detailed discussion of such dyes and certain of their properties may be found in the publication, "The Application Properties of the Certified 'Coal Tar' Colorants," by William H. Peacock, published by the American Cyanamid Company. One example of a particularly suitable dye is that listed and named by the F. D. A. as F. D. & C. Blue #1, this dye having the common name of Brilliant Blue FCF, and having the following chemical designation: Disodium salt of 4-{[4-(N-ethyl-p-sulfobenzylamino)-phenyl]-(2-sulfoniumphenyl) - methylene}-[1 - (M - ethyl-N-p-sulfobenzyl)-$\Delta^{35}$-cyclohexadieneimine].

Coagulated or agglutinated protein particles or "suspensoids" produce a certain degree of ionization in aqueous solutions, and are to a certain extent amphoteric in character. In spite of the amphoteric character of agglutinated protein, it is found that they most readily associate themselves with the moleclues of acid dyes, thus causing a coloration of the agglutinated clumps or particles. Such coloration of the agglutinated protein, while in an aqueous solution also containing free dye molecules is, of course, virtually useless as an indicating means for the reason that the colored suspensoids are invisible against the background of the dye diffused through the remaining portions of the solution.

When acid dyes are used in connection with the porous test patch 10, however, a pronounced color pattern is produced where protein is present, for the reason that the agglutinated protein particles are immobilized in a restricted area surrounding the point of their precipitation or agglutination, due to their inability to pass between the fibers or through the pores of the patch 10. The liquid in which the supsensoids are suspended, however, may spread outwardly on the patch and will do so due to capillary attraction. During the spreading of the liquid from the point at which it is deposited on the patch 10, the dye molecules in the ionized solution migrate in a direction counter to the outwardly spreading liquid and toward the immobilized agglutinated protein particles where they combine with the latter in the manner previously described. This migration of dye molecules causes a spot of strongly contrasting color at the point where the liquid sample was first deposited on the patch 10 for the reason that the original dye concentration is increased at the center and decreased in the areas surrounding the center. Referring to Figure 1, the central color spot is indicated by the reference character 13, being indicated in the drawings by closely spaced horizontal hatching. The central area 13 is strongly and uniformly colored.

The annular area 12 immediately surrounding the central spot 13 is, as indicated in Figure 1, of a contrasting color, being in the illustrative embodiment considerably lighter in shade than the central spot 13. This annular area 12 is stippled in the drawings to indicate the fact that the dye present in that area is somewhat attenuated, the annular area 12 being lighter in color than the central portion 13. A ragged but definite line of demarcation separates the spot 13 from the annular area 12.

As will be noted in all of the drawings, a fringe or ring 11 (diagonal hatching) is formed at the outer periphery of the spreading drop of liquid sample. This ring is usually of a considerably different color than that of the original patch prior to the deposition of the liquid sample thereon and also differs in color from the spot 13. This is due to the fact that most of the acid dyes are heterochroic, that is, change their hues as their concentration in the medium increases or decreases. For example, when the aforementioned F. D. & C. Blue #1 is used, the fringe 11 is yellowish green. Similar changes in color can be produced by the addition of acid to solutions containing the dyes. In the present instance, as the sample drop moves outwardly, its pH changes, due to its picking up acid from the treated patch 10, thus the original color of the dye on the patch 10 is changed at the outer periphery as shown at 11, and this changed color ring remains even after the test patch has been used and dried.

Figure 2:
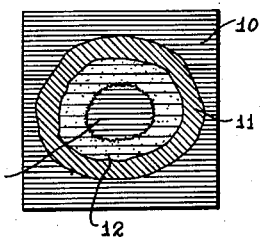
Figures 2 and 3 show similarly treated patches illustrating respectively, the indications of medium and slight concentrations of albumin.
Figure 3:
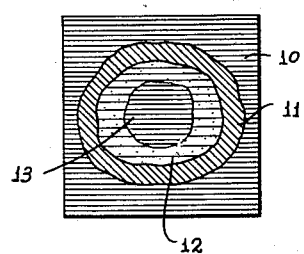
Figure 4:
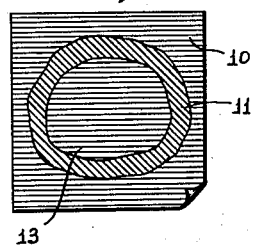
Figure 4 illustrates the pattern produced by an albumin-free test.

As can be seen from an examination of Figure 4, in the case of the albumin-free test, the central portion 13 covers the entire area within the ring 11. This is for the reason that there is no migration of dye ions toward the center of the patch, there being no agglutinated protein at that point to attract the dye ions. As the amount of protein in the sample tested is decreased, the attraction toward the center of the test patch becomes less and less, as illustrated in Figures 2 and 3, respectively.

Turning now to a discussion of the alternate "sequential" test method, it is first noted that the denatured or agglutinated protein will, in most cases, ionize and combine with acid dye ions whether the agglutination and dyeing treatments are performed concurrently or sequentially. The previous description has assumed a patch 10 which was treated both with a coagulant and a dye. Substantially the same results may be achieved, however, by treating the patch 10 with a coagulant only (dipping in a 3% solution of phosphoric acid), drying the same, depositing the test sample thereon, allowing the test sample to dry, and thereafter dipping the patch 10 in a solution of acid dye. At this point, the test procedure just mentioned produces a substantially uniformly colored patch except for a visible ring corresponding to the ring 11 shown in the drawings. If the patch 10 is thereafter washed in running water, however, the dye is removed therefrom except where it is held by the agglutinated protein particles, which are in turn embedded or enmeshed in the pores and interstices of the patch 10.

Ordinarily, I prefer to employ the test patches first above described, which are treated with both a coagulant and a dye. However, in some instances where the amount of protein present in the test sample is extremely small, the contrast between the central spot 13 and the surrounding area may be increased by the use of the sequential process last above described.

While the present test has been described particularly in connection with a test for albumin in urine, it will be realized that other aqueous solutions may be tested for the presence of other types of protein by the use of the invention herein described. While the forms of the invention illustrated and described herein are fully capable of achieving the objects and providing the advantages hereinbefore stated, it will be realized that they may be modified considerably and substitutions of materials may be made without departure from the spirit of the invention. For this reason, I do not mean to be limited to the forms

I claim:

1. A test paper, comprising porous material, for detecting protein in a liquid deposited thereon, said paper being uniformly imbued with an alkaloid reagent for coagulation of protein in said liquid in combination with a protein affinitive, water-soluble, acid coal tar dye.

2. The test paper defined in claim 1 wherein the alkaloid reagent is selected from the group consisting of tannic, picric, phosphotungstic, phosphomolybdic, phosphoric, sulphosalicylic, trichloracetic and ferrocyannic acids.

3. A method of spot testing a liquid for protein content on a porous paper which is inert to said liquid, which includes the steps of: placing a drop of said liquid at a point on said porous paper, said porous paper being impregnated with an alkaloid reagent whereby to coagulate substantially all the protein in said liquid in a restricted area within the pores of said paper; and contacting said coagulated protein with a measured amount of water-soluble acidic protein-reactive coal-tar dye solution whereby to color-delineate said restricted area of protein, the color-delineation of said restricted area having an intensity and size approximately proportional to the amount of protein in said restricted area thereby furnishing a semi-quantitative determination of the amount of said protein in said liquid.

4. A method of spot testing a liquid for protein content on a porous paper which is inert to said liquid, which includes the steps of: placing a drop of said liquid at a point on said porous paper, said porous paper being impregnated with an alkaloid reagent whereby to coagulate substantially all the protein in said liquid in a restricted area within the pores of said paper; and contacting said coagulated protein with a measured amount of water-soluble acidic protein-reactive coal-tar dye solution comprising brilliant blue FCF whereby to color-delineate said restricted area of protein, the color-delineation of said restricted area having an intensity and size approximately proportional to the amount of protein in said restricted area thereby furnishing a semi-quantitative determination of the amount of said protein in said liquid.

5. A method of spot testing a liquid for protein content on a porous paper which is inert to said liquid, which includes the steps of: placing a drop of said liquid at a point on said porous paper, said porous paper being impregnated with an alkaloid reagent selected from the group consisting of tannic, picric, phosphotungstic, phosphomolybdic, phosphoric, sulphosalicylic, trichloracetic and ferrocyannic acids whereby to coagulate substantially all the protein in said liquid in a restricted area within the pores of said paper; and contacting said coagulated protein with a measured amount of water-soluble acidic protein-reactive coal-tar dye solution whereby to color-delineate said restricted area of protein, the color-delineation of said restricted area having an intensity and size approximately proportional to the amount of protein in said restricted area thereby furnishing a semi-quantitative determination of the amount of said protein in said liquid.

6. A method of spot testing, on a porous surface, a liquid for protein content which includes the steps of: placing a measured amount of said liquid to be tested at a point on said porous surface, said porous surface being impregnated with an alkaloid reagent whereby to coagulate substantially all the protein in said liquid in a restricted area on said porous surface; and contacting said coagulated protein with a measured amount of an acidic water-soluble protein-reactive coal-tar dye solution whereby to color-delineate said restricted area of protein, the color-delineation of said restricted area having an intensity and size approximately proportional to the amount of protein in said restricted area thereby furnishing a semi-quantitative determination of the amount of protein in said liquid.

References Cited in the file of this patent

UNITED STATES PATENTS

| | | |
|---|---|---|
| 2,092,566 | Wright | Sept. 7, 1937 |
| 2,314,336 | Goodale | Mar. 23, 1943 |
| 2,633,410 | Beckley | Mar. 31, 1953 |
| 2,671,715 | Beckley | Mar. 9, 1954 |

FOREIGN PATENTS

| | | |
|---|---|---|
| 428,073 | Great Britain | May 7, 1935 |

OTHER REFERENCES

"Practical Physiological Chem.", Hawk, Oser and Summerson, The Blakiston Co., 1947, page 157.

"Experimental Immunochemistry," Kabat and Mayer, Thomas Publ., 1948, pages 489–492.

Free: Gastroenterology (July 1953), received for publication January 1953—presented in part Am. Chem. Soc. 122nd Meeting, September 16, 1952, pages 414–421,